US007916218B2

(12) United States Patent
Choe et al.

(10) Patent No.: US 7,916,218 B2
(45) Date of Patent: Mar. 29, 2011

(54) IMAGE DISPLAY APPARATUS AND METHOD

(75) Inventors: Won-hee Choe, Yongin-si (KR); Chang-yeong Kim, Yongin-si (KR); Seong-deok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1069 days.

(21) Appl. No.: 11/657,622

(22) Filed: Jan. 25, 2007

(65) Prior Publication Data

US 2007/0176916 A1 Aug. 2, 2007

(30) Foreign Application Priority Data

Jan. 27, 2006 (KR) ........................ 10-2006-0008692
Jul. 10, 2006 (KR) ........................ 10-2006-0064443

(51) Int. Cl.
*H04N 5/57* (2006.01)
*H04N 9/73* (2006.01)

(52) U.S. Cl. ...................... 348/602; 348/687; 348/227.1

(58) Field of Classification Search .................. 348/602, 348/603, 604, 655, 658, 687, 673, 223.1, 348/227.1, 659, 661, 224.1; 345/77, 102, 345/690; 382/274, 162, 167, 169, 275; 353/121, 353/97; 359/459; 235/379; 315/307, 291, 315/308, 204; 455/550.1
See application file for complete search history.

(56) References Cited

U.S. PATENT DOCUMENTS

| | | | | |
|---|---|---|---|---|
| 6,822,695 | B2 * | 11/2004 | Lee et al. | 348/603 |
| 7,318,549 | B2 * | 1/2008 | Utz et al. | 235/379 |
| 7,513,420 | B1 * | 4/2009 | Block et al. | 235/379 |
| 7,535,453 | B2 * | 5/2009 | Lee | 345/102 |
| 2005/0051708 | A1 * | 3/2005 | Hotelling | 250/214 AL |
| 2005/0122063 | A1 * | 6/2005 | Lee | 315/291 |
| 2005/0263586 | A1 * | 12/2005 | Lute et al. | 235/379 |
| 2006/0044461 | A1 * | 3/2006 | Popescu-Stanesti et al. | 348/371 |
| 2007/0046908 | A1 * | 3/2007 | Choi | 353/121 |
| 2007/0091435 | A1 * | 4/2007 | Garner et al. | 359/459 |
| 2008/0067955 | A1 * | 3/2008 | Cunningham et al. | 315/307 |
| 2008/0102882 | A1 * | 5/2008 | Sutardja | 455/550.1 |

FOREIGN PATENT DOCUMENTS

| | | | |
|---|---|---|---|
| JP | 2001-125063 | A | 5/2001 |
| JP | 2001-228828 | A | 8/2001 |
| JP | 2002-300498 | A | 10/2002 |
| JP | 2003125060 | * | 4/2003 |
| JP | 2008087520 | * | 4/2008 |
| KR | 10-1998-013821 | A | 5/1998 |
| KR | 10-2004-0054118 | A | 6/2004 |
| KR | 10-2004-0078438 | A | 9/2004 |

* cited by examiner

*Primary Examiner* — Jerome Grant, II
(74) *Attorney, Agent, or Firm* — Sughrue Mion, PLLC

(57) ABSTRACT

An image display apparatus and method are provided. The image display apparatus includes an external light detection module which detects an intensity of external illumination; a storage module which stores a plurality of light emitting unit control values; and a control module which selectively performs, according to a result of a determination, a lightness compensation operation for compensating a lightness of a light emitting unit and a visibility adjustment operation for adjusting the visibility of the original input image. The method includes detecting an intensity of external illumination; determining whether a visibility of an original input image can be ensured according to an input light emitting control value and the detected external illumination intensity; and selectively performing, according to the determination, a lightness compensation operation for compensating a lightness of a light emitting unit and a visibility adjustment operation for adjusting the visibility of the original input image.

34 Claims, 7 Drawing Sheets

IMAGE DISPLAY APPARATUS AND METHOD

CROSS-REFERENCE TO RELATED APPLICATION

This application claims priority from Korean Patent Application Nos. 10-2006-0008692 and 10-2006-0064443 filed on Jan. 27, 2006 and on Jul. 10, 2006, respectively, in the Korean Intellectual Property Office, the disclosures of which are incorporated herein by reference in their entirety.

BACKGROUND OF THE INVENTION

1. Field of the Invention

Apparatuses and methods consistent with the present invention relate to an image display apparatus and method, and more particularly, to an image display apparatus and method which can reduce the power consumption of an image display apparatus and ensure the visibility of images in response to user input for performing power control according to variations in the intensity of external illumination.

2. Description of the Related Art

In general, the power consumption of a display module that displays images accounts for much of the power consumed in an entire image display device.

Recently, image display devices equipped with a display module that supports colors have been commercialized. Display modules that support color images generally consume more power than display modules that support black-and-white images.

Display modules are largely classified into self-emission display modules which can generate light without the aid of additional devices and non-emission display modules which need additional devices such as backlight units to generate light.

A user may change the lightness of a display device according to the intensity of external illumination while watching images displayed by the display device. In this case, the visibility of images displayed by the display device may deteriorate because the change of the lightness of the display device does not reflect various image properties that affect the visibility of the display device, for example, lightness, luminance, contrast, chroma, etc. Also, since the change of the lightness of a display device is generally performed by processing image signals, the power consumption of a display device is rarely taken into consideration when changing the lightness of the display device. Given that most image display devices are compact-sized and portable, it is highly important to develop image display devices that can ensure the visibility of images while consuming less power.

Korean Patent Laid-Open Gazette No. 2004-0054118 discloses a method of controlling the power of a mobile communication terminal which can reduce waste of power and increase the lifetime of batteries by predefining a high-quality item, determining whether input data is associated with the predefined high-quality item, controlling lightness for the input data to be a backlight lightness for the predefined high-quality item if the input data is determined to be associated with the predefined high-quality item, and controlling the lightness for the input data to be a backlight lightness for a predefined low-quality item. This method, however, does not specify how to minimize the power consumption of a display device according to the intensity of external illumination while ensuring the visibility of images.

In addition, Japanese Patent Laid-Open Gazette No. 2001-125063 discloses a method of driving a liquid crystal display (LCD) device which involves increasing the luminance of a backlight unit when there are variations in the intensity of ambient illumination (e.g., outdoor or indoor illumination) and compensating the gamma, luminance, and hue of image signals according to the increase in the luminance of the backlight unit. This method includes compensating visibility according to variations in the intensity of external illumination, but does not specify how to compensate an image according to the intensity of external illumination while reducing the power consumption of a display device.

SUMMARY OF THE INVENTION

The present invention provides an image display apparatus and method which can minimize the power consumption of an image display apparatus by altering the lightness and the image properties of the image display apparatus according to the intensity of external light and can ensure the visibility of images by preventing the quality of images from deteriorating due to a reduction in the power consumption of the image display apparatus.

The present invention also provides an apparatus and method for displaying images which can compensate an original input image by adjusting the lightness and visibility of the original input image in association with each other.

However, the aspects of the present invention are not restricted to those set forth herein. The above and other aspects of the present invention will become more apparent to one of daily skill in the art to which the present invention pertains by referencing a detailed description of the present invention given below.

According to an aspect of the present invention, there is provided an image display apparatus. The image display apparatus includes an external light detection module which detects an intensity of external illumination; a storage module which stores a plurality of light emitting unit control values which are set according to the detected external illumination intensity; and a control module which determines whether visibility of an original input image can be ensured according to an input light emitting control value and the detected external illumination intensity, and selectively performs, according to a result of the determination, a lightness compensation operation for compensating a lightness of a light emitting unit and a visibility adjustment operation for adjusting the visibility of the original input image.

According to another aspect of the present invention, there is provided an image display method. The image display method includes detecting an intensity of external illumination; determining whether a visibility of an original input image can be ensured according to an input light emitting control value and the detected external illumination intensity; and selectively performing, according to a result of the determination, a lightness compensation operation for compensating a lightness of a light emitting unit and a visibility adjustment operation for adjusting the visibility of the original input image.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1:
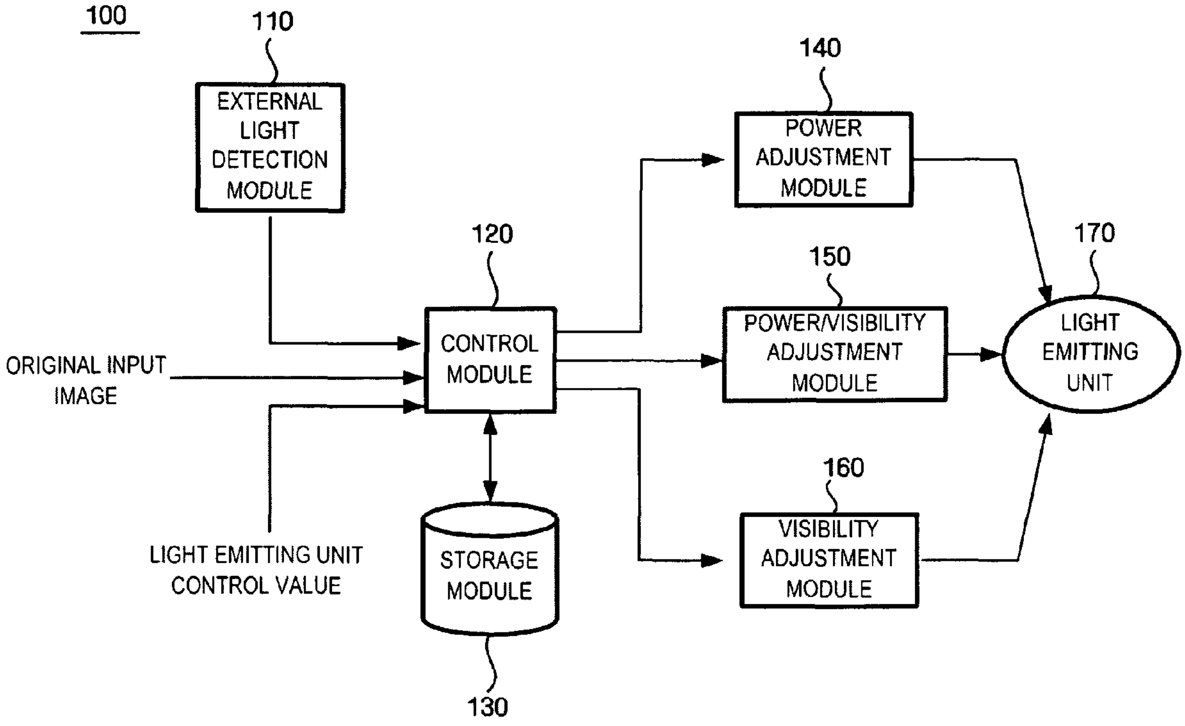
FIG. 1 is a block diagram of an image display apparatus according to an exemplary embodiment of the present invention.

The present invention will now be described more fully with reference to the accompanying drawings, in which exemplary embodiments of the invention are shown. The invention may, however, be embodied in many different forms and should not be construed as being limited to the exemplary embodiments set forth herein; rather, these exemplary embodiments are provided so that this disclosure will be thorough and complete, and will fully convey the concept of the invention to those skilled in the art. Like reference numerals in the drawings denote like elements, and thus their description will be omitted.

The present inventive concept is described hereinafter with reference to flowchart illustrations of user interfaces, methods, and computer program products according to exemplary embodiments of the invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term 'display apparatus' or 'image display apparatus' used herein denotes a flat panel display which compensates an image and displays the compensated image. Flat panel displays are classified into self-emission display devices such as plasma display panels (PDPs) and organic light emitting diodes (OLEDs), and non-emission display devices such as liquid crystal displays (LCDs) and digital lighting processing (DLP) displays.

Also, the term 'light emitting unit' used herein denotes a self-emission display device or a backlight unit of a non-emission display device. A self-emission display device can generate light and can thus be used as a light emitting unit without the aid of a backlight unit.

FIG. 1 is a block diagram of an image display apparatus 100 according to an exemplary embodiment of the present invention. Referring to FIG. 1, the image display apparatus 100 includes an external light detection module 110 which detects an intensity of external illumination, a control module 120 which determines an image compensation mode for an original input image according to an input light emitting unit control value provided by a user, a power adjustment module 140 which performs low power control so that the power consumption of the image display apparatus 100 can be minimized, a power and visibility (power/visibility) adjustment module 150 which performs low power control and image visibility control in association with each other, a visibility adjustment module 160 which ensures the visibility of the original input image, a storage module 130 which stores the correspondences between a plurality of external illumination intensity values and a plurality of light emitting unit control values, and a light emitting unit 170.

The term 'module', ad used herein, denotes, but is not limited to, a software component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Referring to FIG. 1, the external light detection module 110 may detect the intensity of external illumination in the surroundings of the image display apparatus 100. The external light detection module 110 may be comprised of an optical sensor such as a photo diode, a photo transistor, a photoconductive device, or the like.

The control module 130 receives the detected external illumination intensity from the external light detection module 110, and receives an input light emitting unit control value from the user. The control module 130 determines with reference to the storage module 130 whether the visibility of the original input image can be ensured according to the detected external illumination intensity and the input light emitting unit control value, thereby determining an image compensation mode for the original input image.

According to the present exemplary embodiment, three image compensation modes, i.e., a first mode, a second mode, and a third mode, are provided.

In the first mode, a low power function is performed by the power adjustment module 140. In the second mode, the low power function and a visibility ensuring function are performed by the power/visibility adjustment module 150. In the third mode, the visibility ensuring function is performed by the visibility adjustment module 160.

The operations of the external light detection module 110, the control module 120, the power adjustment module 140, the power/visibility adjustment module 150, the visibility adjustment module 160, the storage module 130, and the light emitting unit 170 illustrated in FIG. 1 will hereinafter be described in further detail with reference to FIG. 2.

Figure 2:
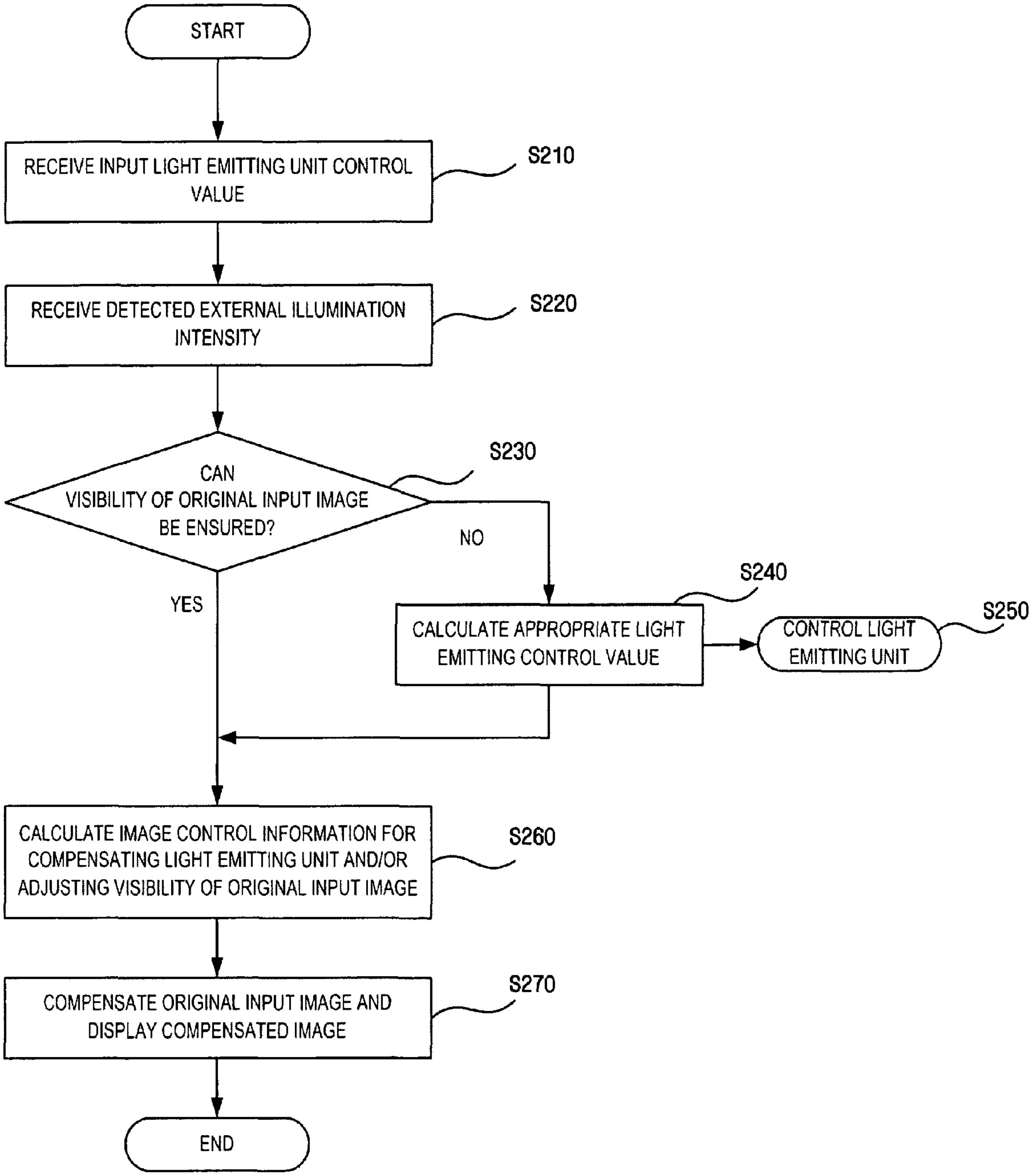
FIG. 2 is a flowchart illustrating an image display method according to an exemplary embodiment of the present invention.

Referring to FIG. 2, in operation S210, the control module 120 receives an input light emitting unit control value. The input light emitting unit control value received by the control module 120 is a control value for adjusting the amount of light emitted by the light emitting unit 170, and may be input from a user. For example, assuming that the maximum amount of light emitted by the light emitting unit 170 is 100%, the user may manually set the amount of light emitted by the light emitting unit 170 to 80%, 60%, or 40% according to the intensity of ambient light. Assume that the amount of light emitted by the light emitting unit 170 is initially set to 100% before the reception of the input light emitting unit control value by the control module 120.

In operation S220, the control module 120 receives the intensity of external illumination detected by the external light detection module 110. Operations S210 and S220 may be performed in inverse order to the one set forth herein, or may be performed at the same time.

In operation S230, the control module 120 determines whether the visibility of an original input image can be ensured according to the detected external illumination intensity and the received light emitting control value by referencing the storage module 130.

The storage module 130 stores a plurality of light emitting unit control values that can ensure the visibility of images for a plurality of external illumination intensity values, respectively. Thus, if it is determined in operation S230 that the input light emitting unit control value is within a range set for the detected external illumination intensity so that the visibility of the original input image can be ensured simply by performing operation S260 which will hereinafter be described, the method skips operations S240 and S250 and proceeds to operation S260. (Operations S240 and S250 will be described in more detail below.) In operation S260, the image display apparatus 100 begins to operate in the first mode, and the power adjustment module 140 calculates image control information for compensating the light emitting unit 170.

In detail, assume that the input light emitting unit control value is 50%. If, even when the light emitting unit 170 consumes 50% of the power previously consumed by the light emitting unit 170 according to the input light emitting unit control value, the visibility of the original input image can be ensured according to the detected external illumination intensity by performing a lightness compensation operation for compensating for a reduction in the power consumption of the light emitting unit 170, then the image display apparatus 100 may be able to operate with low power. In this case, since the lightness of the light emitting unit 170 decreases, the power adjustment module 140 calculates image control information for compensating the light emitting unit 170, compensates the original input image according to a result of the calculation, and displays the compensated image in operation S270. In other words, the image display apparatus 100 is driven in the first mode by the power adjustment module 140.

On the other hand, if, even when the light emitting unit 170 consumes 50% of the power previously consumed by the light emitting unit 170 according to the input light emitting unit control value, the visibility of the original input image can be ensured according to the detected external illumination intensity by performing a lightness compensation operation and a visibility compensation operation for adjusting the visibility of the original input image so that the original input image can be compensated for a reduction in the power consumption of the light emitting unit 170, then the image display apparatus 100 may be driven to be able to perform a lightness compensation operation and a visibility compensation operation. In this case, since a lightness of the light emitting unit 170 decreases, the power/visibility adjustment module 150 calculates image control information for compensating the light emitting unit 170, compensates the original input image according to the result of the calculation, and displays the compensated image in operation S270. In other words, the image display apparatus 100 is driven in the second mode by the power/visibility adjustment module 150.

The compensation of an original input image signal according to image control information according to an exemplary embodiment of the present invention will hereinafter be described in detail with reference to FIGS. 3 through 5.

Figure 3:
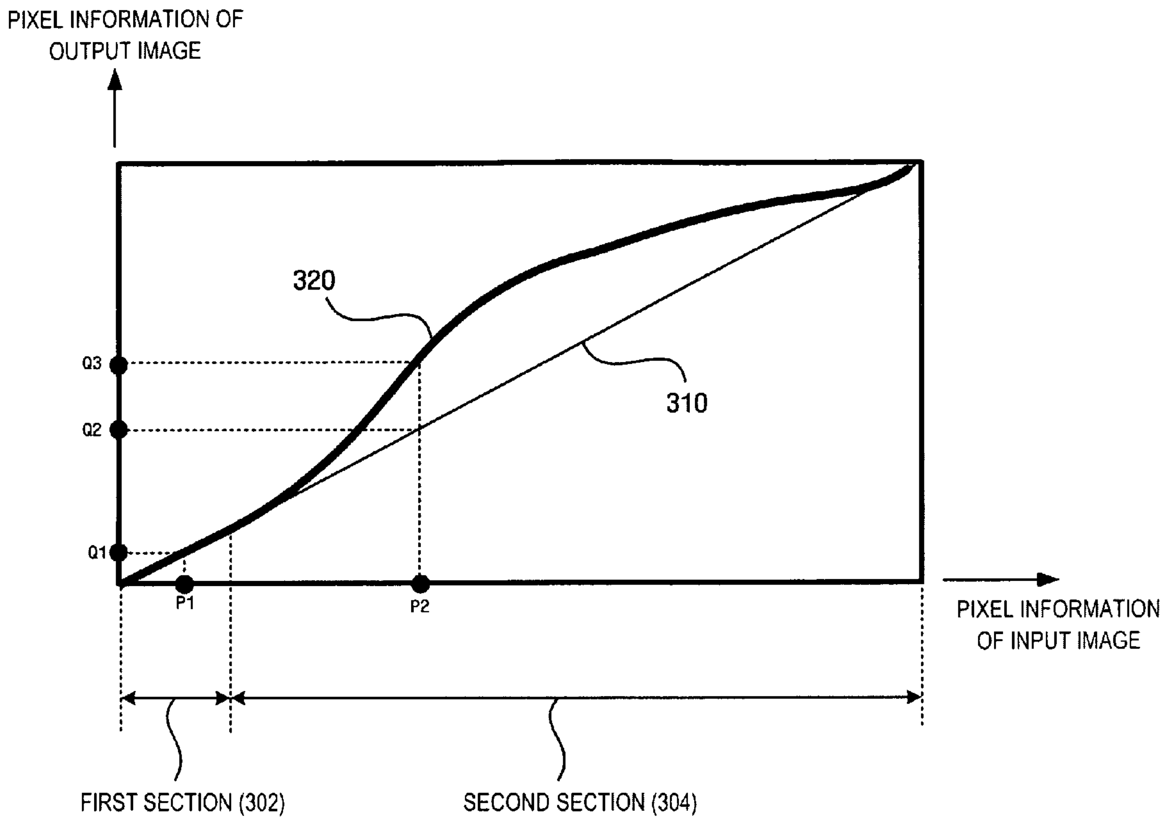
FIG. 3 is a graph illustrating relationships between an original input image and an output image according to an exemplary embodiment of the present invention.
Figure 4:
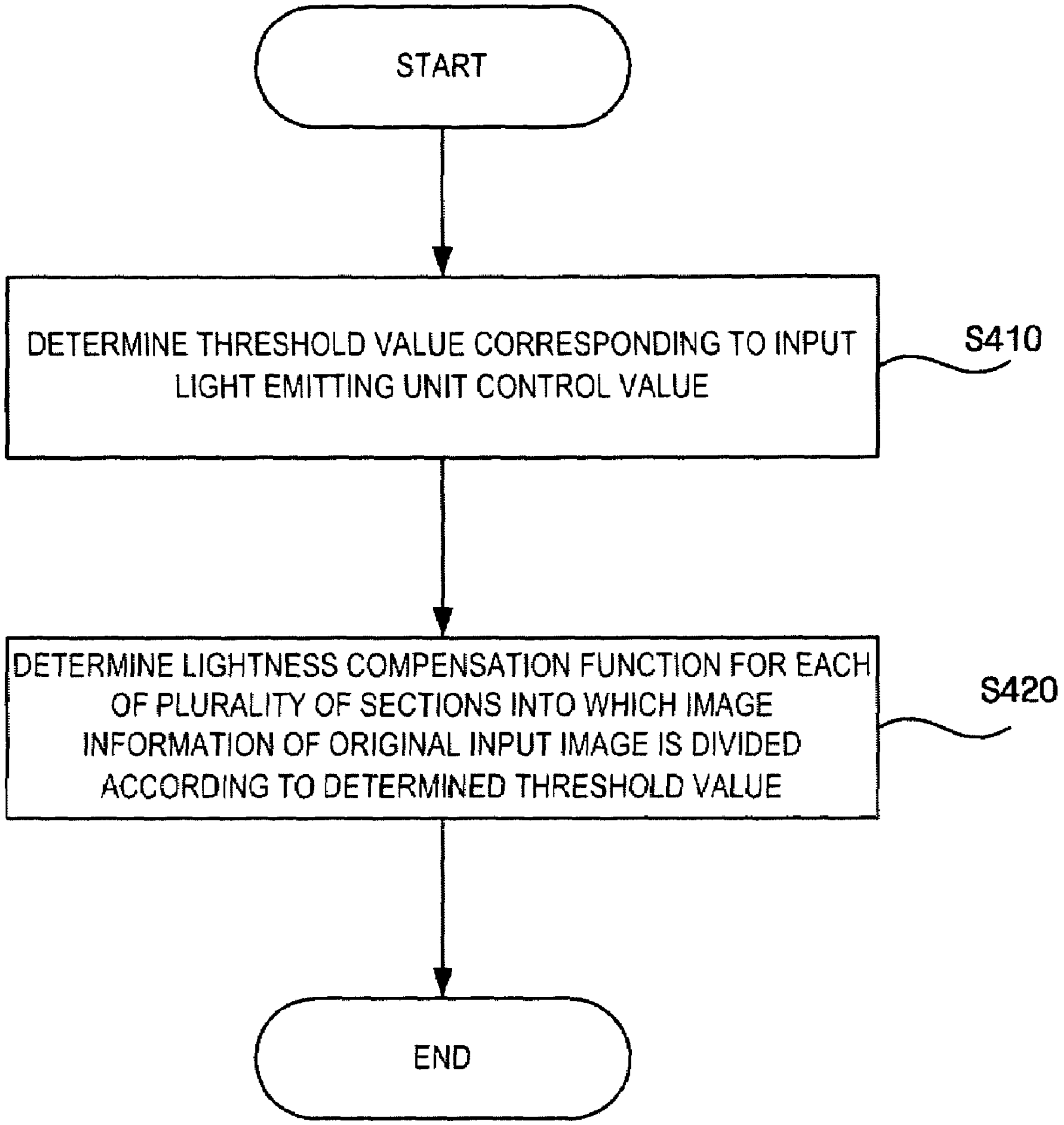
FIG. 4 is flowchart illustrating an exemplary embodiments of a method that produces the graph illustrated in FIG. 3.

FIG. 3 is a graph illustrating the relationship between an original input image and an output image and explains the conversion of an original input image for compensating the original input image for a reduction in the lightness of a light emitting unit according to an exemplary embodiment of the present invention, and FIG. 4 is a flowchart illustrating a method that results in the graph illustrated in FIG. 3.

Referring to FIG. 3, a straight line 310 indicates the relationship between an original input image and an output image when the original input image is not compensated, and a curve 320 indicates the relationship between the original input image and the output image when the original input image is compensated. For example, if pixel information of the original input image can be represented by eight bits, the original input image comprises 256 (=$2^8$) pixel information ranging from 0th to 255th pixel information.

The pixel information of the original input image can be divided into two sections, i.e., a first section 302 and a second section 304. Pixel information belonging to the first section 302 is converted according to the straight line 310, and thus, the original input image is not compensated. On the other hand, the value of pixel information belonging to the second section 304 is increased by an amount, which may be predetermined, thereby compensating the original input image.

In detail, pixel information P1 of the original input image is converted into pixel information Q1 without being compensated because the pixel information P1 belongs to the first section 302. On the other hand, pixel information P2 of the original input image is compensated according to the curve 310 and is thus converted not into pixel information Q2 but into pixel information Q3 because the pixel information P2 belongs to the second section 304. In other words, the value of the pixel information P2 of the original input image is increased by |Q2-Q3|. The value of pixel information at the boundary between the first section 302 and the second section 304 will hereinafter be referred to as a threshold, and the amount by which the value of pixel information of the original input image is increased through compensation, e.g., |Q2-Q3|, will hereinafter be referred to as a compensation amount. A threshold and a compensation amount correspond to the aforementioned image control information.

Referring to FIG. 4, in operation S410, a threshold value may be determined according to an input light emitting unit control value provided by a user. For example, the power adjustment module 140 may include a table indicating the correspondences between a plurality of light emitting unit control values and a plurality of threshold values. In this case, the power adjustment module 140 may determine a threshold value corresponding to the input light emitting unit control value with reference to the table.

The length of the first section 302 and the amount by which the pixel information P2 belonging to the second section 304 is increased through compensation, i.e., |Q3-Q2|, may increase proportionally to a reduction in the lightness of the backlight unit 170. The reduction in the lightness of the backlight unit 170 may be determined according to the input light emitting unit control value.

Also, the length of the first section 302 and the amount by which the pixel information P2 belonging to the second section 304 is increased through compensation, i.e., |Q3-Q2|, may be determined according to the pattern of distribution of pixel values of the original input image. For example, if most pixels of the original input image are classified as low luminance pixels, both the length of the first section 302 and |Q3-Q2| may be reduced, thereby enhancing capabilities to render low-luminance grayscale images which may have deteriorated due to a reduction in the lightness of the backlight unit 170 and providing clear and vivid images.

FIG. 3 illustrates the compensation of pixel information of an original input image. However, the compensation of pixel information of the original input image illustrated in FIG. 3 may be interpreted as compensation of pixel information of the original input image based on the luminance of the pixel information of the original input image. In other words, when the luminance of a pixel of the original input image is below a threshold value, which may be predetermined, the pixel of the original input image is not compensated; and when the luminance of the pixel of the original input image is above the threshold value, the pixel of the original input image is increased by a compensation amount. The compensation amount may be predetermined.

Also, FIG. 3 illustrates that a pixel value of an original input image belonging to the first section 302 is output as it is without being compensated. However, the present invention is not restricted to this. In other words, even pixel information belonging to the first section 302, like pixel information belonging to the second section 304, may be compensated by a compensation amount.

Referring to FIG. 4, in operation S420, the power adjustment module 140 determines a lightness compensation function for each of a plurality of sections that are obtained by dividing the pixel information of the original input image according to the determined threshold value obtained in operation S410.

A lightness compensation function may be determined according to image control information. The image control information may include a set of coefficients or a value that determines the values of the coefficients as well as the value of a threshold and a compensation amount. For convenience of description, the threshold and the compensation amount will hereinafter be referred to as the threshold TH and the compensation amount g, respectively.

The threshold TH and the compensation amount g may be altered proportionally to a reduction in the lightness of the light emitting unit 170 or according to the pattern of distribution of pixel values of an original input image. For example, if most pixels of an original input image are classified as low luminance pixels, the threshold TH may be set to be low, and the compensation amount g may be set to be small, thereby enhancing capabilities to render low-luminance grayscale images which may have deteriorated due to a reduction in the lightness of the backlight unit 170 and providing clear and vivid images.

The power adjustment module 140 may determine the threshold TH with reference to a lookup table that indicates the correspondences between a plurality of light limiting unit control values and a plurality of threshold values. For example, if the lightness of a screen of the image display apparatus 100 considerably decreases due to a reduction in the power of the light emitting unit 170, the threshold TH may be set to be low. For this, a lookup table that stores the value of the threshold TH corresponding to the reduction in the power of the light emitting unit 170 may be stored in an additional memory included in the power adjustment module 140 or the image display apparatus 100. The compensation amount g may be determined with reference to a lookup table that indicates the correspondences between a plurality of pieces of pixel information and a plurality of compensation amounts.

Alternatively, the threshold TH and the compensation amount g may be determined by a function using a reduction in the lightness of the screen of the image display apparatus 100 and pixel information of the original input image as parameters. Still alternatively, the threshold TH and the compensation amount g may be experimentally determined in advance.

If a pixel value x of the original input image is the same as or smaller than the threshold TH, the pixel information x of the original input image may not be compensated. On the contrary, if the pixel information x is greater than the threshold TH, the pixel information x of the original input image may be compensated, as indicated by Equation (1):

$$\text{if } x>TH \quad y1=F*g \quad \text{else,} \quad y2=x \tag{1}$$

where y1 denotes pixel information of a compensated image obtained by compensating the original input image, and F denotes a lightness compensation function which can be represented by a curve 320 illustrated in FIG. 3. The lightness compensation function F can be determined using pixel information of the original input image as a parameter.

For example, the lightness compensation function F can be represented as a polynomial, as indicated by Equation (2):

$$F(x)=a*x^5+b*x^4+c*x^3+d*x^2+e*x^1+f \tag{2}$$

where coefficients a, b, c, d, e, and f are experimentally determined or determined according to pixel information of an original input image.

The values of the coefficients a, b, c, d, e, and f and the compensation amount g may be determined based on the fact that the intersection between the pixel information y1 and the pixel information y2, i.e., the value of x that satisfies the equation: $x=(ax^5+bx^4+cx^3+dx^2+ex^1+f)*g$, corresponds to the threshold TH.

If the original input image is converted according to the graph 320 illustrated in FIG. 3, then pixel information of the original input image is increased by the compensation amount g, and thus, an image having almost the same lightness as the original input image can be provided to a user even when the power consumption of the light emitting unit 170 decreases and thus the lightness of the screen of the image display apparatus 100 decreases. Also, pixel information of the original input image less than the threshold TH is output as it is without being compensated, thereby obtaining a contrast effect and providing a user with a visibility of the original input image. This will hereinafter be described in further detail with reference to FIGS. 5A and 5B.

If the pixel information x of the original input image is a luminance component of the original input image, F*g may indicate compensated luminance information, wherein a compensated image of the original input image may be obtained by compensating the luminance of the original input image.

Figure 5A:
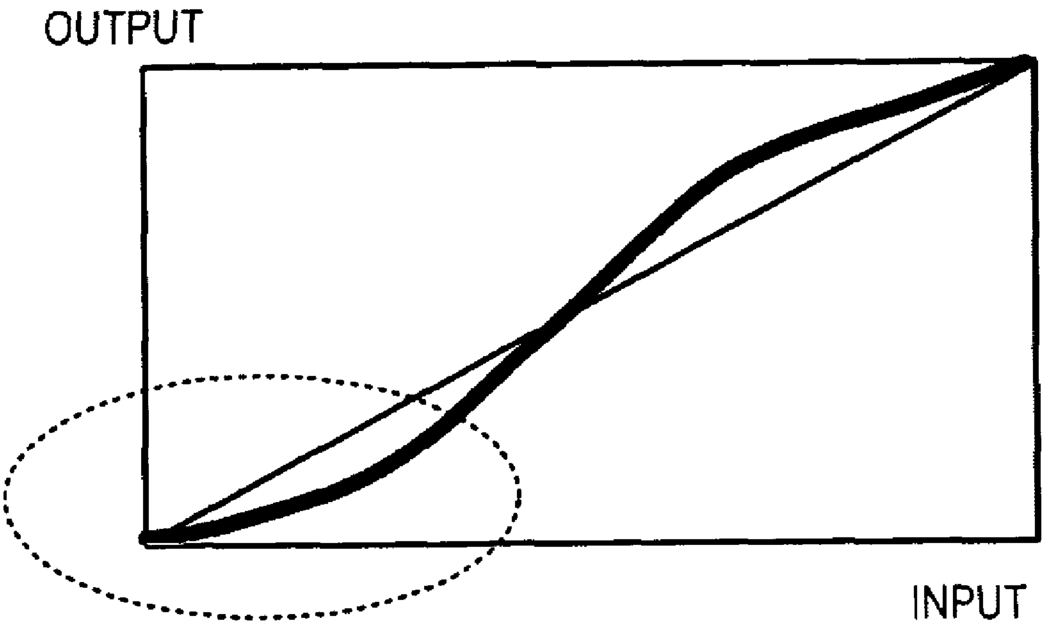
FIGS. 5A and 5B are graphs for comparing the low-grayscale image properties of an exemplary embodiment of the present invention with the low-grayscale image properties of the related art.
Figure 5B:
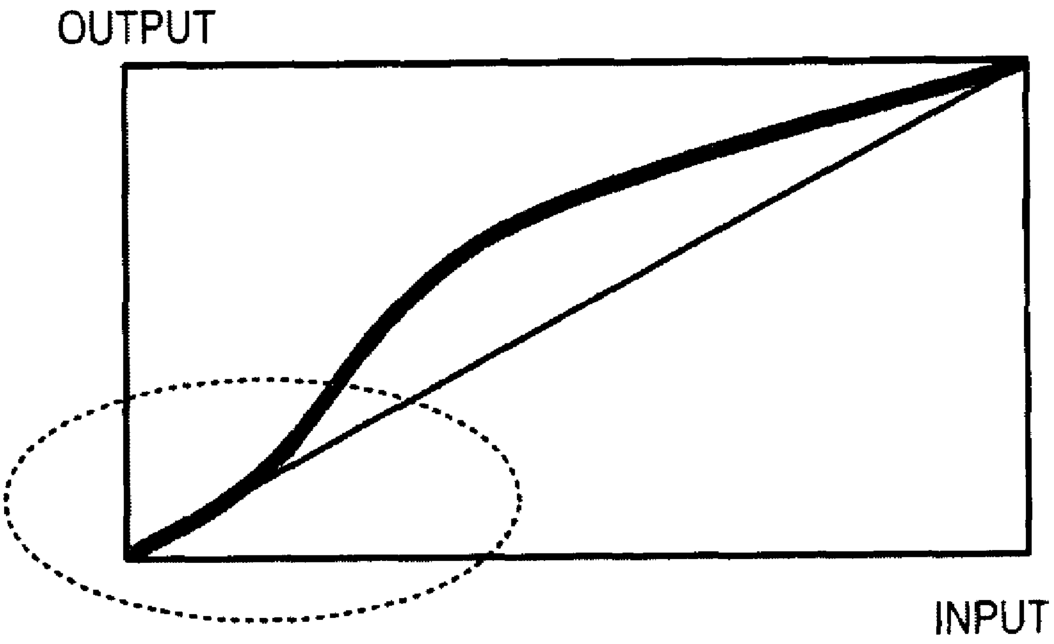

FIGS. 5A and 5B are diagrams for comparing the low-grayscale image properties of an exemplary embodiment of the present invention with the low-grayscale image properties of the related art. Specifically, FIG. 5A illustrates the low-grayscale image properties of the related art, and FIG. 5B illustrates the low-grayscale image properties of an exemplary embodiment of the present invention.

In general, when the power consumption of a light emitting unit decreases, the luminance of a screen of an image display apparatus decreases. If the related art method is applied to the situation when the luminance of a screen of an image display apparatus decreases due to a reduction in the power consumption of a light emitting unit, the capabilities of the image display apparatus to distinguish between portions of an original input image, particularly between portions of the original input image with low grayscale levels, may considerably deteriorate, as indicated by a dotted outline of a circle illustrated in FIG. 5A.

On the other hand, if an exemplary embodiment of the present invention is applied to the situation when the luminance of a screen of an image display apparatus decreases due to a reduction in the power consumption of a light emitting unit, the grayscales of low-grayscale portions of an original input image may be maintained as they are, as indicated by a dotted outline of a circle illustrated in FIG. 5B. Thus, even when the luminance of the screen of the image display apparatus decreases, the quality of the original input image can be prevented from deteriorating by improving the lightness and contrast characteristics of portions of the original input image with intermediate or high grayscale levels while maintaining the capabilities of the image display apparatus to distinguish between portions of the original input image with low grayscale levels.

Referring to FIG. 2, in operation S240, if the input light emitting unit control value is determined to be outside the range set for the detected external illumination intensity and thus the visibility of the original input image cannot be ensured simply by adjusting the visibility of the original input image, the control module 120 calculates an appropriate light emitting unit control value that can ensure the visibility of the original input image, instead of using the input light emitting unit control value.

For example, assume that the maximum amount of light emitted by the light emitting unit 170 is 100%. If the visibility of the original input image cannot be ensured when the user sets the amount of light emitted by the light emitting unit 170 to 60% in consideration of the intensity of ambient illumination, then the control module 120 may calculate an appropriate light emitting unit control value that can ensure the visibility of the original input image, i.e., may reset the amount of light emitted by the light emitting unit 170 to, for example, 80%, so that the visibility of the original input image can be ensured. Then, the image display apparatus 100 is driven to operate in the second mode by the power/visibility adjustment module 150. There are situations when the amount of light emitted by the light emitting unit 170 must be maintained at 100% due to the influence of ambient illumination. In these cases, the image display apparatus 100 is driven to operate in the third mode by the visibility adjustment module 160.

In short, when the control module 120 calculates an appropriate light emitting unit control value instead of using the input light emitting unit control value, the image display apparatus 100 operates in the second mode. On the other hand, when the control module 120 neither uses the input light emitting unit control value nor calculates an appropriate light emitting unit control value, the image display apparatus 100 operates in the third mode.

In operation S250, in the situation when the image display apparatus 100 operates in the third mode, the visibility adjustment module 160 controls the light emitting unit 170 to maintain the amount of light emitted by the light emitting unit 170 at 100%. In operation S260, the visibility adjustment module 160 calculates image control information for compensating the original input image according to the intensity of the external illumination, i.e., image control information for adjusting the visibility of the original input image. In operation S270, the visibility adjustment module 160 compensates the original input image based on the image control information, and displays the compensated image.

The adjustment of the visibility of an image by the visibility adjustment module 160 will hereinafter be described in detail with reference to FIGS. 6A and 6B.

Figure 6A:
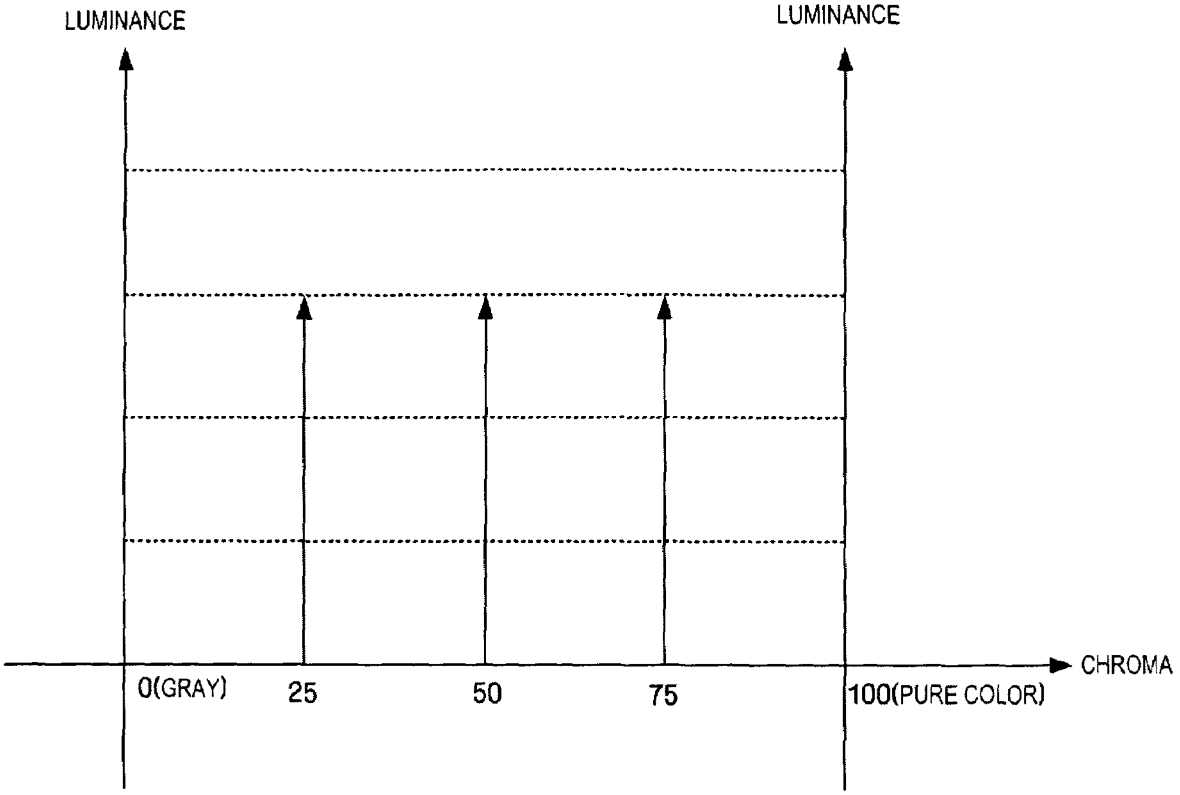
FIGS. 6A and 6B are graphs for explaining a method of enhancing visibility according to an exemplary embodiment of the present invention.
Figure 6B:
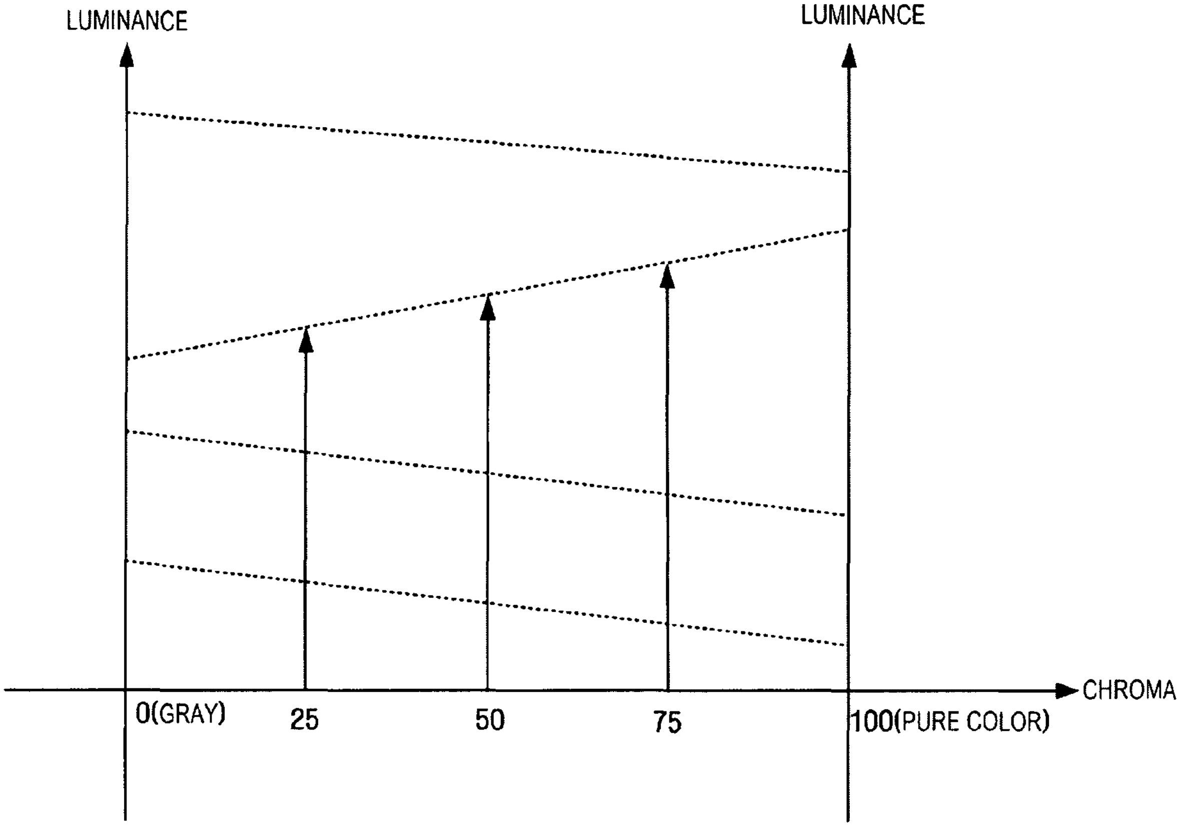

FIGS. 6A and 6B are diagrams for explaining the compensation of an image by applying a weight according to a chroma of the image and an intensity of ambient illumination when the intensity of external illumination is higher than the intensity of light emitted by a light emitting unit. Specifically, FIG. 6A illustrates the situation when a same weight is applied to portions of an image having different chroma values, and FIG. 6B illustrates the situation when different weights are applied to portions of an image having different chroma values.

Referring to FIG. 6A, when an image comprises a plurality of pixels respectively having chroma values of 25, 50, and 75, the visibility of the image can be ensured by applying the same weight to the pixels so that the pixels can have the same luminance.

On the other hand, referring to FIG. 6B, when an image comprises a plurality of pixels respectively having chroma values of 25, 50, and 75, the visibility of the image can be ensured by applying different weights to the pixels so that the pixels can have different luminances.

Dotted lines illustrated in FIGS. 6A and 6B may be interpreted as visibility compensation functions that represent the relationship between chroma and luminance for each visibility compensation level. A visibility compensation level denotes an amount by which the visibility of an image is to be compensated according to the intensity of external illumination, and may be set in advance.

Referring to FIG. 2, in operation S250, if the control module 120 calculates an appropriate light emitting unit control value in operation S240, the power/visibility adjustment module 150 controls the light emitting unit 170 according to the appropriate light emitting unit control value provided by the control module 120. For example, the power/visibility adjustment module 150 may control the light emitting unit 170 according to the appropriate light emitting unit control value provided by the control module 120 such that the light emitting unit 170 can emit 80% of the maximum amount of light that can be emitted by the light emitting unit 170. In this case, the power consumption of the light emitting unit 170 can be reduced by 20%. In operation S260, the power/visibility adjustment module 150 calculates first image control information for compensating for a reduction in the lightness of the light emitting unit 170 and second image control information for adjusting the visibility of the original input image. In operation S270, the power/visibility adjustment module 150 compensates the original input image based on the first image control information and the second image control information, and displays the compensated image. In short, in the second mode, a lightness compensation operation for compensating the lightness of the light emitting unit 170 and a visibility compensation operation for adjusting the visibility of the original input image according to the intensity of external illumination are performed in association with each other.

A method of compensating an original input image for a reduction in the lightness of the light emitting unit 170 and a method of adjusting the visibility of an original input image according to the intensity of external illumination have already been described above, and thus, detailed descriptions thereof will be skipped. The operation of the power/visibility adjustment module 150, i.e., a method of compensating for a reduction in the lightness of the light emitting unit 170 while adjusting the visibility of the original input image will hereinafter be described in detail.

Assuming that weights $\alpha$ and $\beta$ are respectively applied to a lightness compensation function Fb and a visibility compensation function Fv, $\alpha=C$ and $\beta=1-C$ where C is an image control parameter that determines the weights $\alpha$ and $\beta$. It is determined which of lightness compensation and visibility compensation is to be performed more intensively according to the value of the image control parameter C. A plurality of image control parameter values respectively corresponding to a plurality of light emitting unit control values, which can be input by a user, and a plurality of external illumination intensity values, which are provided by the external light detection module 110, may be stored in the storage module 130. In this case, the control module 120 may determine the value of the image control parameter C with reference to the storage module 130.

When C=1, an original input image is compensated for a reduction in the lightness of the light emitting unit 170. When C=0, only the visibility of the original input image is compensated. In other words, the situation when C=1 corresponds to the first mode, the situation when C=0 corresponds to the third mode, and the situation when 0<C<1 corresponds to the second mode.

The image compensation function Fc that is needed by the image display apparatus 100 to compensate an image can be represented by Equation (3):

$$Fc=Fb*C+Fv*(1-C) \tag{3}$$

where Fb and Fv respectively denote a lightness compensation function and a visibility compensation function.

According to exemplary embodiments of the present invention, it is possible to ensure the visibility of images by controlling power supplied to a light emitting unit of a display apparatus according to the intensity of external illumination to minimize the power consumption of the light emitting unit and preventing the quality of images displayed by the image display apparatus from deteriorating due to a reduction in the power consumption of the light emitting unit.

In addition, according to an exemplary embodiment of the present invention, it is possible to compensate an original input image by adjusting the lightness and visibility of the original input image in association with each other.

While the present inventive concept has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image display apparatus comprising:

an external light detection module which detects an intensity of external illumination;

a storage module which stores a plurality of light emitting unit control values which are set according to the detected external illumination intensity and indicate a percentage of a maximum amount of emitted light; and a control module which determines whether visibility of an original input image can be ensured according to an input light emitting control value and the detected external illumination intensity, and selectively performs, according to a result of the determination, a lightness compensation operation for compensating a lightness of a light emitting unit and a visibility adjustment operation for adjusting the visibility of the original input image.

2. The image display apparatus of claim 1, wherein the input light emitting control value is provided by a user, and the control module determines whether the visibility of the original input image can be ensured according to an input light emitting control value and the detected external illumination intensity with reference to the storage module.

3. The image display apparatus of claim 1, further comprising a power and visibility adjustment module which performs the lightness compensation operation and the visibility compensation operation in association with each other according to the result of the determination performed by the control module.

4. An image display apparatus comprising:

an external light detection module which detects an intensity of external illumination;

a storage module which stores a plurality of light emitting unit control values which are set according to the detected external illumination intensity; and a control module which determines whether visibility of an original input image can be ensured according to an input light emitting control value and the detected external illumination intensity, and selectively performs, according to a result of the determination, a lightness compensation operation for compensating a lightness of a light emitting unit and a visibility adjustment operation for adjusting the visibility of the original input image; and a power adjustment module which controls the light emitting unit according to the input light emitting unit control value in response to the result of the determination performed by the control module, determines a threshold value based on the input light emitting control value, classifies image information of the original input image, according to the determined threshold value, into image information greater than the determined threshold value and image information less than the determined threshold value, and converts the original input image according to image control information.

5. The image display apparatus of claim 4, wherein the image control information increases the image information of the original input image by an amount.

6. The image display apparatus of claim 4, wherein, if the image information of the original input image is less than the determined threshold value, the power adjustment module does not convert the image information of the original input image.

7. The image display apparatus of claim 4, wherein, if the image information of the original input image is less than the determined threshold value, the power adjustment module converts the image information of the original input image by increasing the image information of the original input image by an amount.

8. The image display apparatus of claim 4, wherein the power adjustment module classifies the image information of the original input image into a first image information section and a second image information section according to the determined threshold value, wherein the power adjustment module maintains image information belonging to the first image information section without converting the image information and converts image information belonging to the second image information section according to the image control information.

9. The image display apparatus of claim 8, wherein the image control information increases the image information of the original input image by an amount.

10. An image display apparatus comprising:

an external light detection module which detects an intensity of external illumination;

a storage module which stores a plurality of light emitting unit control values which are set according to the detected external illumination intensity;

a control module which determines whether visibility of an original input image can be ensured according to an input light emitting control value and the detected external illumination intensity, and selectively performs, according to a result of the determination, a lightness compensation operation for compensating a lightness of a light emitting unit and a visibility adjustment operation for adjusting the visibility of the original input image; and a power and visibility adjustment module which performs the lightness compensation operation and the visibility compensation operation in association with each other according to the result of the determination performed by the control module, wherein the power and visibility adjustment module performs the lightness compensation operation and the visibility compensation operation in association with each other by using an image control parameter that adjusts a plurality of weights respectively applied to the lightness compensation operation and the visibility compensation operation.

11. An image display apparatus comprising:

an external light detection module which detects an intensity of external illumination;

a storage module which stores a plurality of light emitting unit control values which are set according to the detected external illumination intensity;

a control module which determines whether visibility of an original input image can be ensured according to an input light emitting control value and the detected external illumination intensity, and selectively performs, according to a result of the determination, a lightness compensation operation for compensating a lightness of a light emitting unit and a visibility adjustment operation for adjusting the visibility of the original input image; and a visibility adjustment module which compensates the original input image by adjusting luminance by using at least one weight applied according to a chroma of the original input image and an intensity of ambient illumination in response to the result of the determination performed by the control module.

12. The image display apparatus of claim 11, wherein a same weight is applied to a plurality of pixels of the original input image.

13. The image display apparatus of claim 11, wherein different weights are applied to pixels of the original input image having different chromas.

14. An image display method comprising:

detecting an intensity of external illumination;

determining whether a visibility of an original input image can be ensured according to an input light emitting control value and the detected external illumination intensity, the input light emitting control value indicating a percentage of a maximum amount of emitted light; and selectively performing, according to a result of the determining, a lightness compensation operation for compensating a lightness of a light emitting unit and a visibility adjustment operation for adjusting the visibility of the original input image.

15. The image display method of claim 14, wherein the input light emitting control value is provided by a user.

16. An image display method comprising:

detecting an intensity of external illumination;

determining whether a visibility of an original input image can be ensured according to an input light emitting control value and the detected external illumination intensity; and selectively performing, according to a result of the determining, a lightness compensation operation for compensating a lightness of a light emitting unit and a visibility adjustment operation for adjusting the visibility of the original input image, wherein the selectively performing the lightness compensation operation and the visibility adjustment operation comprises:

controlling the light emitting unit according to the input light emitting unit control value in response to the result of the determining; and determining a threshold value based on the input light emitting control value, classifying image information of the original input image, according to the determined threshold value, into image information greater than the determined threshold value and image information less than the determined threshold value, and converting the original input image according to image control information.

17. The image display method of claim 16, wherein the image control information increases the image information of the original input image by an amount.

18. The image display method of claim 16, wherein the converting the original input image comprises, if the image information of the original input image is less than the determined threshold value, not converting the image information of the original input image.

19. The image display method of claim 16, wherein the converting the original input image comprises, if the image information of the original input image is less than the determined threshold value, converting the image information of the original input image by increasing the image information of the original input image by an amount.

20. The image display method of claim 16, wherein the classifying image information and the converting the original image information comprises classifying the image information of the original input image into a first image information section and a second image information section according to the determined threshold value, maintaining image information belonging to the first image information section without converting the image information, and converting image information belonging to the second image information section according to the image control information.

21. The image display method of claim 20, wherein the image control information increases the image information of the original input image by an amount.

22. The image display method of claim 16, wherein the selectively performing the lightness compensation operation and the visibility adjustment operation comprises performing the lightness compensation operation and the visibility compensation operation in association with each other according to the result of the determination.

23. The image display method of claim 22, wherein the selectively performing the lightness compensation operation and the visibility adjustment operation comprises performing the lightness compensation operation and the visibility compensation operation in association with each other by using an image control parameter that adjusts a plurality of weights respectively applied to the lightness compensation operation and the visibility compensation operation.

24. The image display method of claim 16, wherein the selectively performing the lightness compensation operation and the visibility adjustment operation comprises compensating the original input image by adjusting luminance by using at least one weight applied according to a chroma of the original input image and an intensity of ambient illumination in response to the result of the determining.

25. The image display method of claim 24, wherein a same weight is applied to a plurality of pixels of the original input image.

26. The image display method of claim 24, wherein different weights are applied to pixels of the original input image having different chromas.

27. A method of displaying an image, the method comprising:

converting a first power level to a second power level based on an external illumination;

dividing input image information into at least two groups, and separately processing the image information of the at least two groups so that a picture quality of an image output at the second power level maintains a picture quality of an image output at the first power level; and outputting the processed image information of the at least two groups at the second power level, wherein a threshold is set according to the second power level in order to divide the image information into the at least two groups.

28. The method of claim 27, wherein the dividing the input image information into at the least two groups comprises:

processing the image information in order to maintain an image information value if the image information value is less than a threshold; and processing the image information in order to increase the image information value if the image information value is equal to or greater than the threshold.

29. The method of claim 27, wherein the dividing the input image information into the at least two groups comprises:

processing the image information so that an image information value is increased by a first increase rate if the image information value is less than a threshold; and processing the image information so that the image information value is increased by a second increase rate if the image information value is equal to or greater than the threshold.

30. The method of claim 27, wherein the image information is luminance information of each pixel.

31. A method of displaying an image, the method comprising:

converting a first power level to a second power level based on an external illumination;

dividing input image information into at least two groups, and separately processing the image information of the at least two groups so that a picture quality of an image output at the second power level maintains a picture quality of an image output at the first power level; and outputting the processed image information of the at least two groups at the second power level, wherein the dividing the input image information into the at least two groups comprises adjusting a brightness of the image output at the second power level according to a saturation of the image.

32. The method of claim 31, wherein the brightness of the image when the saturation appears grey and the brightness of the image when the saturation appears as a solid color have different weights.

33. The method of claim 27, further comprising adjusting an amount of output light based on an amount of output light set by the external illumination or a user in order to secure a visibility of the image output at the second power level.

34. The method of claim 33, wherein the amount of the output light is less than or equal to 80% of a maximum amount thereof.

* * * * *